United States Patent
Zhao et al.

(10) Patent No.: US 12,530,045 B2
(45) Date of Patent: Jan. 20, 2026

(54) CONTROLLER, SYSTEM AND METHOD FOR CONTROLLING MEMORIES IN STORAGE DEVICES

(71) Applicant: InnoGrit Technologies Co., Ltd., Shanghai (CN)

(72) Inventors: Gang Zhao, Chandler, AZ (US); Jie Chen, Shanghai (CN); Abhilash Matthew, Santa Clara, CA (US); Wei Jiang, Fremont, CA (US); Lin Chen, Cupertino, CA (US)

(73) Assignee: InnoGrit Technologies Co., Ltd., Shanghai (CN)

( * ) Notice: Subject to any disclaimer, the term of this patent is extended or adjusted under 35 U.S.C. 154(b) by 72 days.

(21) Appl. No.: 18/231,133

(22) Filed: Aug. 7, 2023

(65) Prior Publication Data
US 2025/0053188 A1 Feb. 13, 2025

(51) Int. Cl.
*G06F 1/08* (2006.01)
(52) U.S. Cl.
CPC ..................... *G06F 1/08* (2013.01)
(58) Field of Classification Search
CPC .................... G06F 1/12; G06F 1/10
See application file for complete search history.

(56) References Cited

U.S. PATENT DOCUMENTS

| | | | | |
|---|---|---|---|---|
| 5,646,904 A * | 7/1997 | Ohno | ................. | G06F 13/1694 365/194 |
| 9,817,434 B2 * | 11/2017 | Kim | ................. | G06F 1/04 |
| 10,027,332 B1 * | 7/2018 | Wang | ................. | H04L 1/0082 |
| 10,599,206 B2 * | 3/2020 | Cox | ................. | G11C 7/1045 |
| 11,150,842 B1 * | 10/2021 | Bommana | ................. | G06F 3/0634 |
| 11,513,955 B2 * | 11/2022 | Lee | ................. | G11C 7/1066 |
| 2006/0187226 A1 * | 8/2006 | Bruno | ................. | G06F 13/1689 345/534 |
| 2007/0106836 A1 * | 5/2007 | Lee | ................. | G06F 13/385 711/E12.019 |
| 2015/0160689 A1 * | 6/2015 | Mylly | ................. | G06F 1/12 713/500 |
| 2020/0278806 A1 * | 9/2020 | Hsieh | ................. | G06F 3/0679 |
| 2021/0271959 A1 * | 9/2021 | Chettuvetty | ................. | G11C 11/54 |
| 2023/0026320 A1 * | 1/2023 | Kim | ................. | G11C 7/1087 |
| 2023/0081557 A1 * | 3/2023 | Kang | ................. | G11C 16/3495 365/27 |
| 2023/0095330 A1 * | 3/2023 | Lee | ................. | G11C 11/419 365/154 |
| 2024/0257884 A1 * | 8/2024 | Shiraishi | ................. | G11C 16/32 |

\* cited by examiner

*Primary Examiner* — Phil K Nguyen
(74) *Attorney, Agent, or Firm* — IPro, PLLC

(57) ABSTRACT

Disclosed herein is a new technique for providing a storage controller with variable interface communication speeds to allow the storage controller to set different communication speeds and frequencies for different communication channels between the storage controller and respective memories. A controller comprises: a processor; registers; and a clock generator configured to generate clock signals respectively for multiple communication channels based on values stored in the registers. The controller is configured to communicate with non-volatile memories through the communication channels respectively using the clock signals.

16 Claims, 7 Drawing Sheets

CONTROLLER, SYSTEM AND METHOD FOR CONTROLLING MEMORIES IN STORAGE DEVICES

TECHNICAL FIELD

The present disclosure relates to the technical field of storage devices, and in particular to a controller, system and method for controlling memories in storage devices with variable interface speed.

BACKGROUND

The evolution of modern computing systems and data centers is partly driven by the emergence of solid-state storage devices (e.g., solid-state drives (SSDs)) that have demonstrated higher performance of speed and latency over traditional hard drives. Unlike traditional storage devices such as hard drives that use a physically spinning medium, solid-state storage devices use non-volatile memories such as NAND or NOR flash memories to achieve data storage.

A solid-state storage device may have a controller and a number of non-volatile memories placed on and connected through a printer circuit board (PCB) with a standard form factor for various consumer or enterprise usage models. Interfaces between the controller and the non-volatile memories may be grouped into communication channels. A controller may have 4, 8 or 16 communication channels. To achieve higher storage capacity, a solid-state storage device may integrate more non-volatile memories onto the PCB, have multiple non-volatile memories sharing a single communication channel. A multi-load or multi-drop PCB topology may be in a solid-state storage device with high-density of storage.

A multi-load PCB may adopt PCB topologies as shown in FIGS. 1 and 2. In FIG. 1, a communication channel L0 of a controller 10 is physically connected to two non-volatile memories 20a and 20b through two branch communication channels L1 on a PCB, respectively. In FIG. 2, a communication channel L0 of a controller 10 is connected to four non-volatile memories 20a, 20b, 20c and 20d through two first-stage branch communication channels L1 and four second-stage branch communication channels L2 on a PCB, respectively. By comparison, the PCB traces connecting the controller and the non-volatile memories in FIG. 2 are longer than those in FIG. 1, and each communication channel from the controller 10 to each non-volatile memory in FIG. 2 has higher device loading and more branches than that in FIG. 1. The interface speed tends to degrade with longer PCB traces due to increased insertion loss, crosstalk and distortions. In addition, a communication channel with higher device loading also suffers from more speed degradations due to heavier reflections. For a controller that communicates at the same interface speed through multiple communication channels, the maximum interface speed may be limited by the longest physical trace on the PCB with the heaviest device loading.

As a result, the performance and throughput of a storage device may be limited by the PCB layout and storage capacity requirements. This is a particularly serious problem for enterprise applications with a greater number of solid-stage memories placed a single PCB, where the PCB traces can be from around one inch to all the way beyond ten inches. The communication channels with shorter PCB traces have the potential to run at a higher speed but may be limited by other communication channels with longer traces and heavier device loading, if the controller is not able to communicate through different communication channels at different interface speed. Because a controller may be used in different PCB topologies, it benefits from the capability of flexibly setting interface speeds for different communication channels.

SUMMARY

Disclosed herein is a controller comprising: a processor; registers; and a clock generator configured to generate clock signals respectively for multiple communication channels based on values stored in the registers, wherein the controller is configured to communicate with non-volatile memories through the communication channels respectively using the clock signals.

In an exemplary embodiment, at least two of the clock signals may have different frequencies.

In an exemplary embodiment, the processor may be configured to determine and store the values into the registers.

In an exemplary embodiment, the processor may be further configured to determine passing spaces of one or more parameters for communication through the communication channels and configured to determine the values based on the passing spaces.

In an exemplary embodiment, the one or more parameters are selected from a group consisting of frequencies, reference voltages, and clock delays.

In an exemplary embodiment, the processor may further be configured to set the values stored in the registers based on the passing spaces.

In an exemplary embodiment, the processor may further be configured to select one or more of the communication channels for storing data according to the values stored in the registers and access frequentness of the data.

In an exemplary embodiment, the clock generator may comprise clock sources and multiplexers; and each of the multiplexers may be connected to at least one of the clock sources and may be configured to generate a clock signal by selecting one of the clock sources based on the values stored in the registers.

In an exemplary embodiment, the clock generator may further comprise one or more clock dividers respectively connected to the multiplexers and configured to generate the clock signals based on the values stored in the registers.

In another aspect, there is provided a system comprising the controller described above, wherein the system is a solid-state drive (SSD), a flash drive, a mother board, a processor, a computer, a server, a gaming device, or a mobile device.

In yet another aspect, there is provided a method of using the controller described above, comprising: generating the clock signals, by using the clock generator, respectively for the multiple communication channels based on the values stored in the registers; and communicating with the non-volatile memories through the communication channels respectively using the clock signals.

In an exemplary embodiment, at least two of the clock signals may have different frequencies.

In an exemplary embodiment, the method may further comprise: determining and storing the values into the registers by using the processor.

In an exemplary embodiment, determining the values may comprise: determining passing spaces of one or more parameters for communication through the communication channels and determining the values based on the passing spaces, by using the processor.

In an exemplary embodiment, the one or more parameters are selected from a group consisting of frequencies, reference voltages, and clock delays.

In an exemplary embodiment, determining the values based on the passing spaces may further comprise: setting the values stored in the registers based on the passing spaces.

In an exemplary embodiment, the method may further comprise: selecting one or more of the communication channels for storing data according to the values stored in the registers and access frequentness of the data, by using the processor.

In an exemplary embodiment, generating the clock signals may comprise: generating the clock signals by selecting one of clock sources based on the values stored in the register, by using multiplexers in the clock generator or using the multiplexers and clock dividers connected thereto.

In an exemplary embodiment, the non-volatile memories may be NAND flash memories, NOR flash memories, magnetoresistive random access memories (MRAM), resistive random access memories (RRAM), phase change random access memories (PCRAM), or Nano-RAM memories.

In further another aspect, there is provided a non-transitory machine-readable medium having information, wherein the information, when read by a hardware processor system, causes the hardware processor system to perform the method described above.

DETAILED DESCRIPTION

Figure 1:
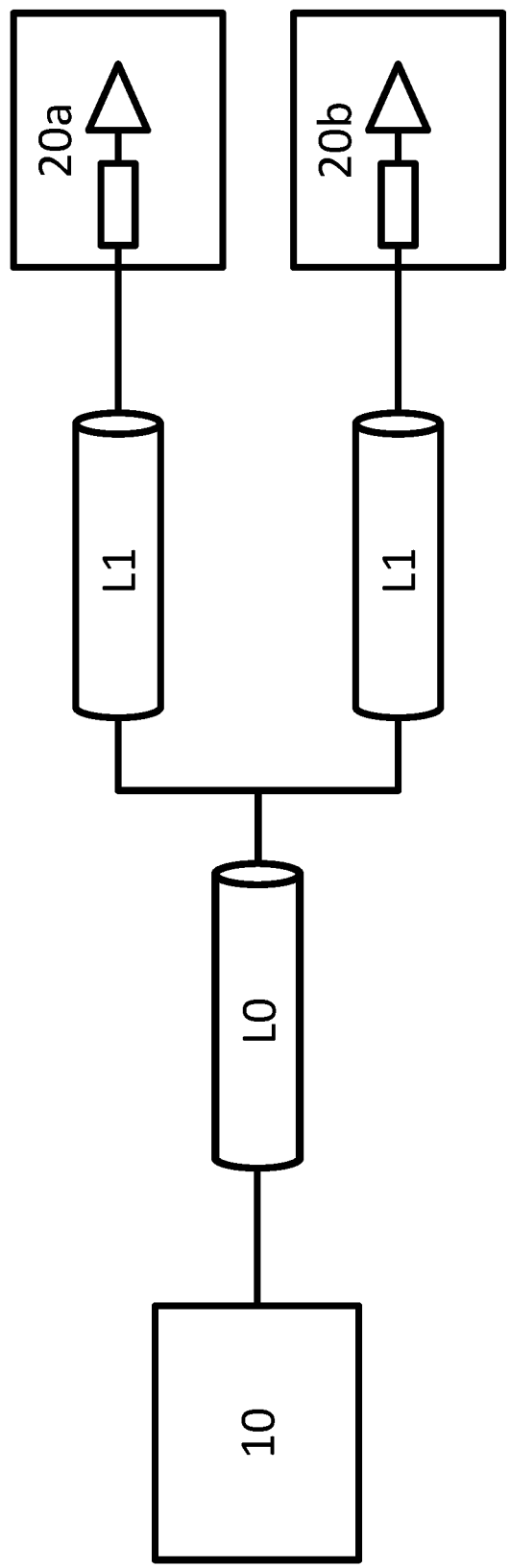
FIG. 1 shows a PCB topology with device loading of 2 memories per communication channel.
Figure 2:
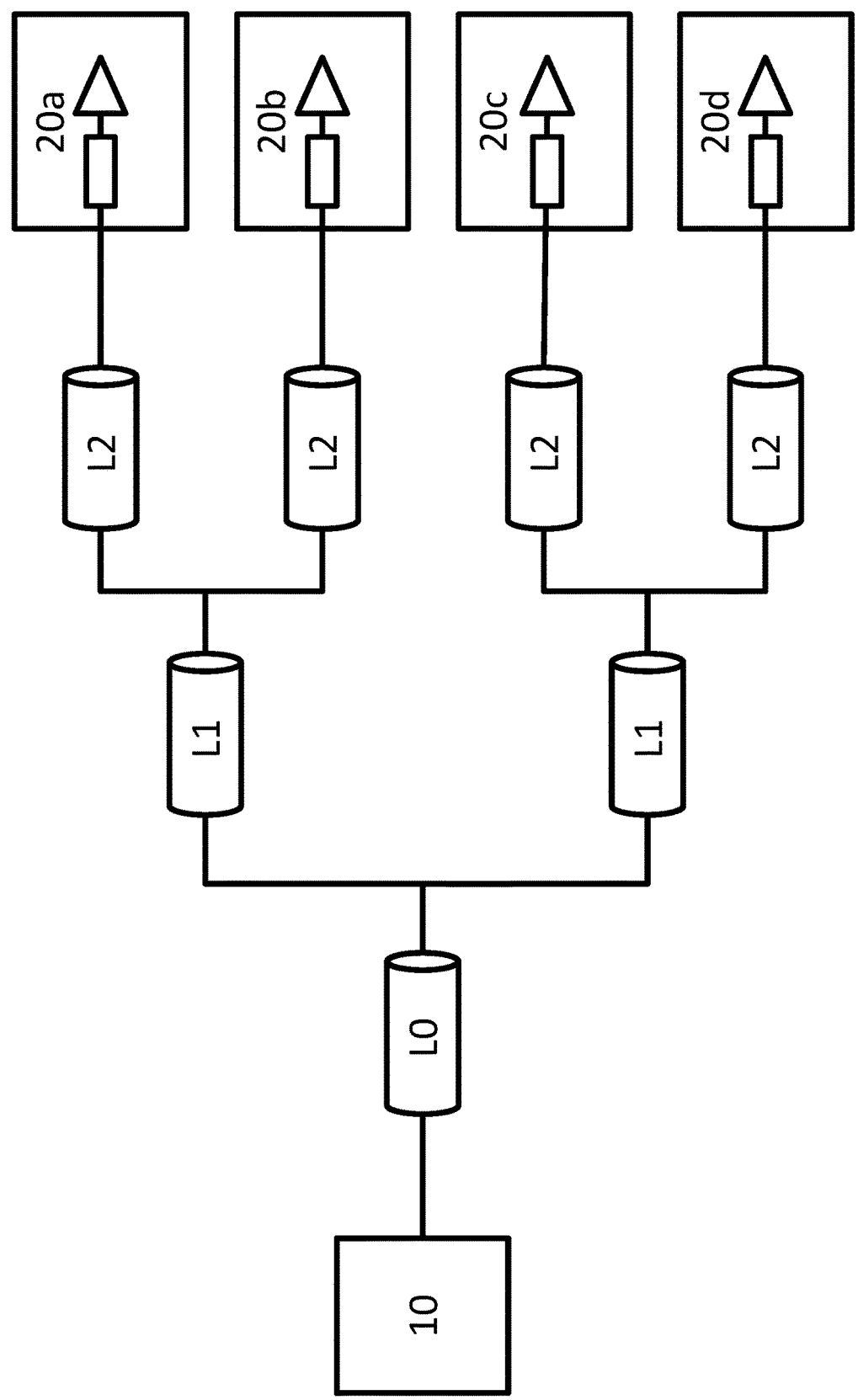
FIG. 2 shows a PCB topology with device loading of 4 memories per communication channel.

Specific embodiments according to the present disclosure will now be described in detail with reference to the accompanying figures. Like elements in the various figures are denoted by like reference numerals for consistency.

Figure 3:
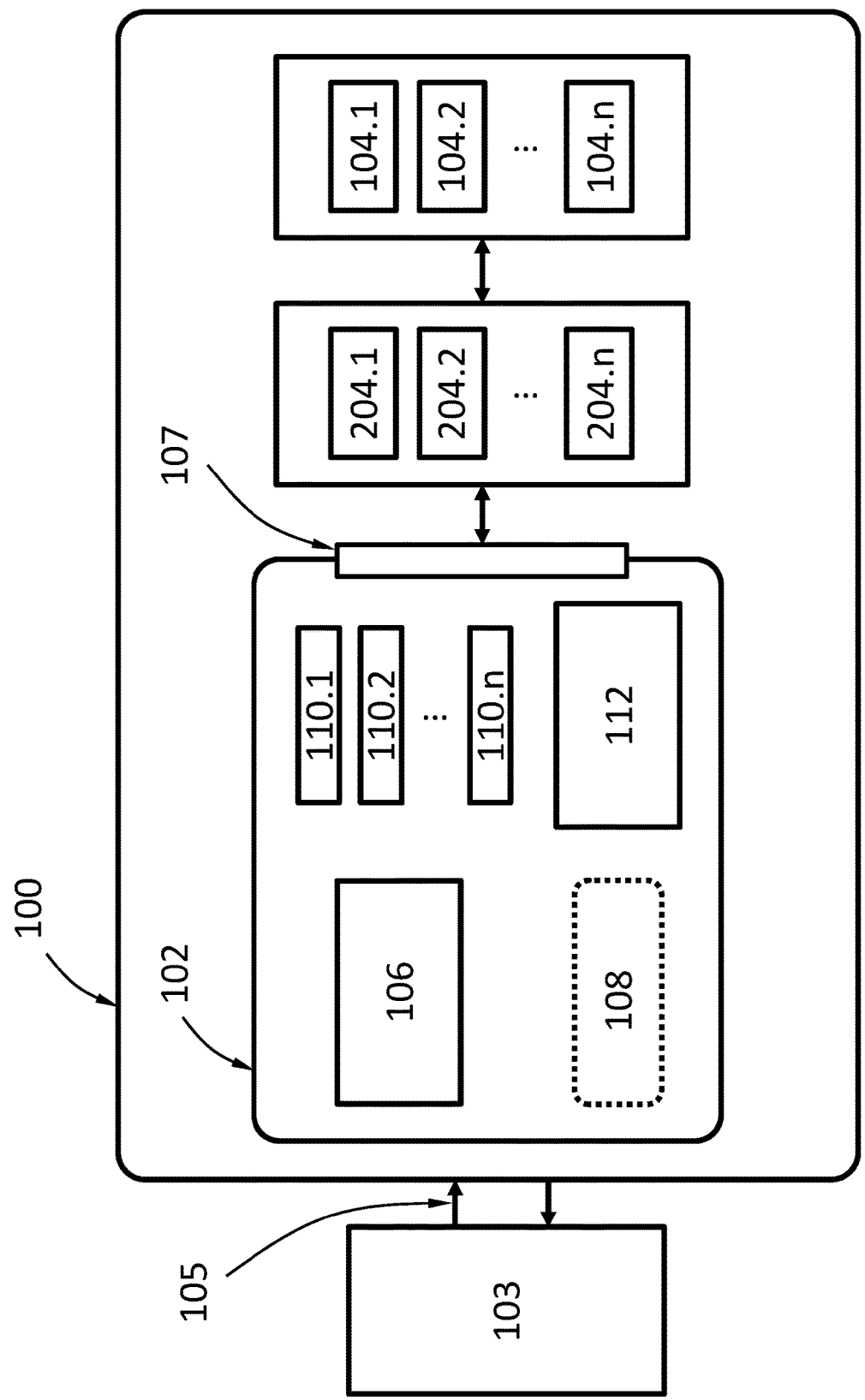
FIG. 3 schematically shows a storage device in accordance with an embodiment.

FIG. 3 schematically shows a storage device 100 in accordance with an embodiment. The storage device 100 has a first interface 105, a second interface 107, a controller 102 and a plurality of memories 104.1 to 104.$n$ (collectively memories 104), where n may be a positive integer larger than 1, such as 2, 3, 4 or a larger number. In specific examples of this embodiment, the storage device 100 may be an SSD or any other storage device comprising non-volatile memories. The non-volatile memories (NVM) may be NAND flash memories, NOR flash memories, magnetoresistive random access memories (MRAM), resistive random access memories (RRAM), phase change random access memories (PCRAM), Nano-RAM memories or other devices configured to store information.

The first interface 105 may be any existing or to-be-developed interface that is configured to couple the storage device 100 to a host 103 and receive data from and transmit data to the host 103, such as a U.2 interface, an M.2 interface, or a Serial AT Attachment (SATA) interface. The host 103 may be any device capable of performing data processing tasks and operations using the storage device 100 via the first interface 105, such as central processing unit (CPU). The second interface 107 may be any existing or to-be-developed interface that is configured to couple a controller 102 to one or more of the memories 104.1 to 104.$n$. In an embodiment, the second interface 107 may be a multi-channel interface, which includes multiple communication channels between the controller 102 and the plurality of memories 104.1 to 104.$n$. Each memory is connected to one communication channel. In an example of this embodiment, the communication channels may be in one-to-one correspondence with the memories. However, in another example of this embodiment, one communication channel may connect to two or more memories.

The controller 102 may comprise a processor 106, a plurality of registers 110.1 to 110.$n$ (collectively registers 110), and a clock generator 112, where n may be a positive integer larger than 1, such as 2, 3, 4 or a larger number. Optionally, the controller 102 may have a storage medium 108, which may be a non-transitory computer-readable storage medium. The storage medium 108 may store computer programs or executable instructions which can be executed by the processor 106. Although FIG. 3 shows the storage medium 108 as a part of the controller 102, the storage medium 108 may be external to the controller 102. The processor 106 may be a computer processor configured to execute instructions (e.g., software or firmware), such as a microprocessor, a microcontroller, a field-programmable gate array (FPGA), an application-specific IC (ASIC) or a graphic processing unit (GPU).

The registers 110.1 to 110.$n$ may be any general-purpose register that can temporarily store data. The registers 110.1 to 110.$n$ may each be a separate physical device or be parts of one or more physical devices. In an embodiment, each register may be associated to one communication channel, and may store a value representing a communication speed of the communication channel. For example, a value of 0000 stored in the registers may represent the lowest communication speed in a frequency range, and a value of 1111 stored in the registers may represent the highest communication speed in the frequency range. That is, the values stored in the registers may represent different communication speeds in an ascending order. In another example, the value of 0000 stored in the registers may represent the highest communication speed in the frequency range, and the value of 1111 stored in the registers may represent the lowest communication speed in the frequency range. In other words, the values stored in the registers may represent different communication speeds in a descending order. In another example, the values stored in the registers represent different communication speeds without being in any particular order.

Figure 4:
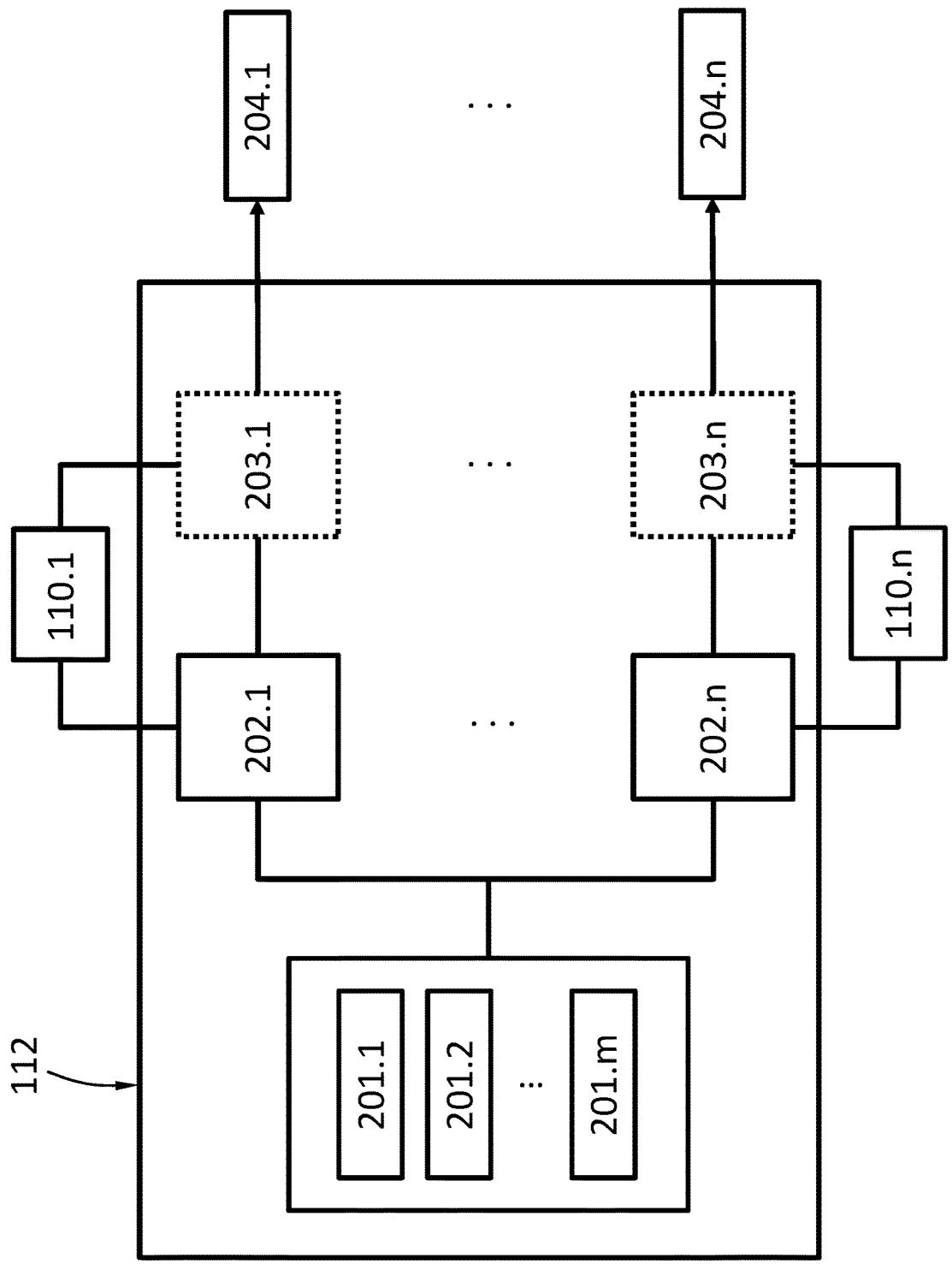
FIG. 4 schematically shows a clock generator in accordance with an embodiment.

The clock generator 112 may be controlled based on the values in the plurality of registers 110 to generate clock signals with various frequencies. FIG. 4 schematically shows the clock generator 112 in accordance with an embodiment. As shown in FIG. 4, the clock generator 112 may include one or more clock sources 201.1 to 201.$m$ (collectively clock sources 201), a plurality of multiplexers 202.1 to 202.$n$ (collectively multiplexers 202), and a plurality of optional clock dividers 203.1 to 203.$n$ (collectively clock dividers 203), where m may be a positive integer, such as 1, 2, 3, 4 or a larger number. The number m of the clock sources 201 may or may not be equal to n. The clock generator 112 may be configured to provide the clock signals to the memories 104.1 to 104.n via communication channels 204.1 to 204.n (collectively communication channels 204). More specifically, the clock generator 112 may be configured to provide the clock signals to control units for the communication channels 204. The control units may be part of the controller 102. Although FIG. 4 shows that the memories 104 and the communication channels 204 have one-to-one correspondence, the correspondence between the memories 104 and the communication channels 204 is not limited to that. For example, in an embodiment, two memories may share the same communication channel.

Each of the clock sources 201.1 to 201.m may be configured to generate a reference clock signal with a fixed frequency. Different clock sources may generate reference clock signals of different frequencies. Examples of the clock sources may include a phase-locked loop (PLL) device and a frequency-locked loop (FLL) device.

In an embodiment, each of the multiplexers 202.1 to 202.n may be connected to at least one of the clock sources 201.1 to 201.m, and may be configured to generate a clock signal by selecting one of the clock sources connected thereto based on values stored in the registers 110.1 to 110.n. Specifically, the multiplexer 202.1 may select one of the clock sources 201.1 to 201.m based on the value stored in the register 110.1, and generate a clock signal using the reference clock signal generated by that one clock source. The clock signal output by the multiplexer 202.1 is provided to one or more memories via communication channel 204.1. The operation of the other multiplexers is similar.

In an embodiment, each of the multiplexers 202.1 to 202.n may be connected to at least one of the clock sources 201.1 to 201.m, and may be configured to generate a clock signal by selecting one of the clock sources connected thereto based on values stored in the registers 110.1 to 110.n. In addition, each of the multiplexers 202.1 to 202.n may also be connected to a corresponding clock divider 203.1 to 203.n. The clock signals output by the multiplexers 202.1 to 202.n may serve as inputs of respectively the clock dividers 203.1 to 203.n, and the clock dividers 203.1 to 203.n may be configured to generate clock signals based on values stored in the registers 110.1 to 110.n. Specifically, the multiplexer 202.1 may select one of the clock sources 201.1 to 201.m based on the value stored in the register 110.1, and generate a clock signal using the reference clock signal generated by that one clock source. The clock signal output by the multiplexer 202.1 may be input to the clock divider 203.1, and the clock divider 203.1 may generate a clock signal with a clock frequency determined based on the value stored in the register 110.1. The clock signal output by the clock divider 203.1 is provided to one or more memories via communication channel 204.1. More specifically, the clock signal output by the clock divider 203.1 is provided to a control unit for the communication channel 204.1. The control unit may be part of the controller 102. The operation of the other multiplexers and clock dividers is similar.

In an embodiment, the clock signals generated by the clock generator 112 may have different frequencies for different communication channels 204. For example, when the frequency of the clock signal provided to a control unit for the communication channel 204.1 is $f_1$, the frequency of the clock signal provided to a control unit for the communication channel 204.2 (not shown) is $f_2$, . . . , and the frequency of the clock signal provided to a control unit for the communication channel 204.n is $f_n$, $f_1 \neq f_2 \neq \ldots f_n$, that is, no two control units may have clock signals of the same frequency. In an embodiment, control units for some of the communication channels 204.1 to 204.n may receive clock signals of the same frequency, as long as all of the communication channels 204.1 to 204.n do not have clock signals of the same frequency. For example, $f_j = f_k \neq f_1 \ldots$ or $f_n$, where $j \neq k$, $1 \leq j \leq n$, and $1 \leq k \leq n$.

The clock signals generated by the clock generator 112 provided to control units for the communication channels 204.1 to 204.n may serve as internal clock signals of the storage device 100. Referring back to FIG. 3, the processor 106 may further generate the interface data, strobe signals and read enable signals from the control units according to the internal clock signals. The interface data, strobe signals and read enable signals eventually determine the communication speed on each of the communication channels 204.1 to 204.n connecting the controller 102 to the memories 104.1 to 104.n. In the storage device 100, the registers 110 and the clock generator 112 may be integrated into the controller 102.

In FIG. 3, the processor 106, the storage medium 108, the registers 110 and the clock generator 112 are shown as separate components. However, in at least one embodiment, some or all of the processor 106, the storage medium 108, the registers 110 and the clock generator 112 may be integrated in an integrated circuit (IC) chip.

The registers 101.1 to 101.n, the communication channels 204.1 to 204.n, and the memories 104.1 to 104.n may or may not have one-to-one correspondence with one another. For example, some of the memories 104.1 to 104.n may share the same communication channel, or some of the communication channels 204.1 to 204.n with the same communication speed may correspond to the same register. The control units for the communication channels 204 may or may not have one-to-one correspondence with the communication channels 204.

Figure 5:
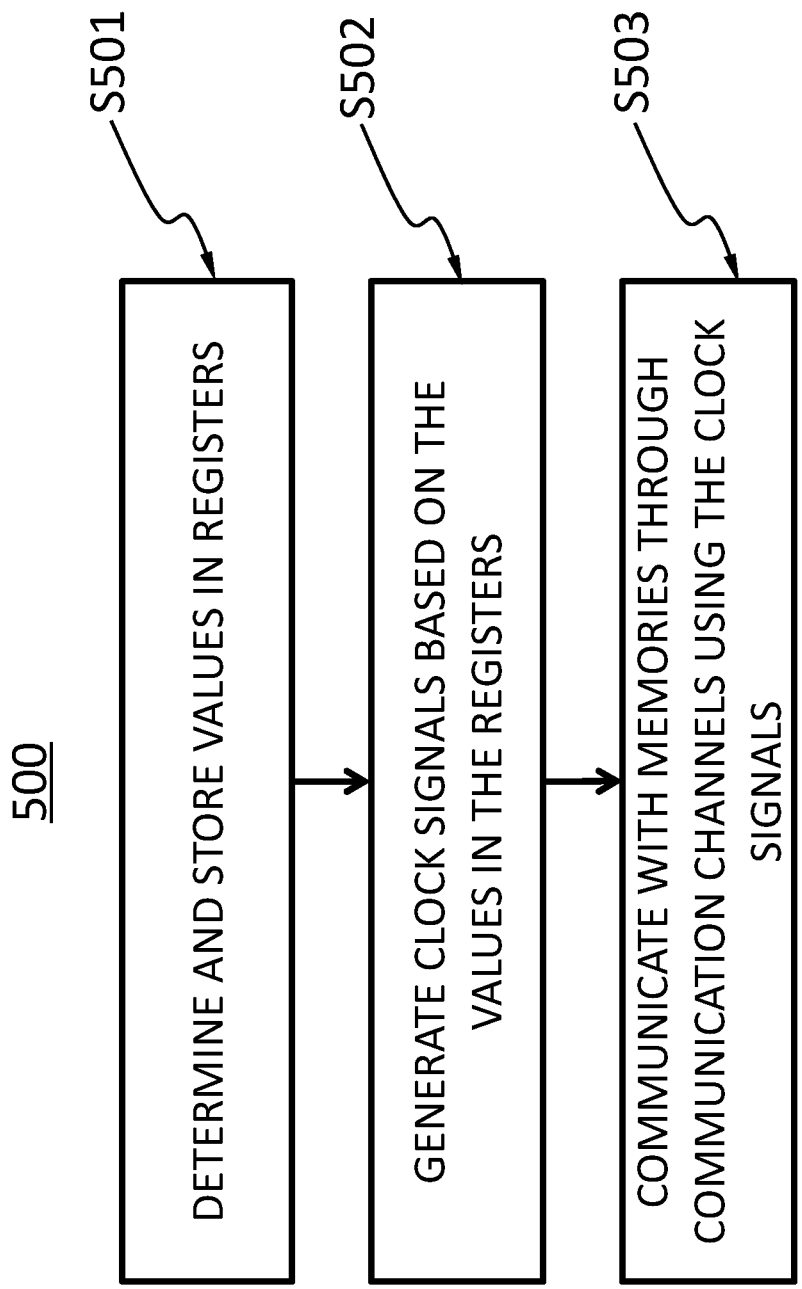
FIG. 5 schematically shows a flowchart of a method for controlling a storage device in accordance with an embodiment.

FIG. 5 schematically shows a flowchart of a method 500 for controlling a storage device in accordance with an embodiment. In this embodiment, the controller may be the controller 102 described above. The method 500 may be executed by a processor (e.g. the processor 106 as shown in FIG. 3) of the controller. In step S501, by using the processor, values of registers corresponding to communication channels between the controller and respective memories may be determined and then stored into the corresponding registers. The value of each register may represent the communication speed of a communication channel corresponding to that register.

Figure 6:
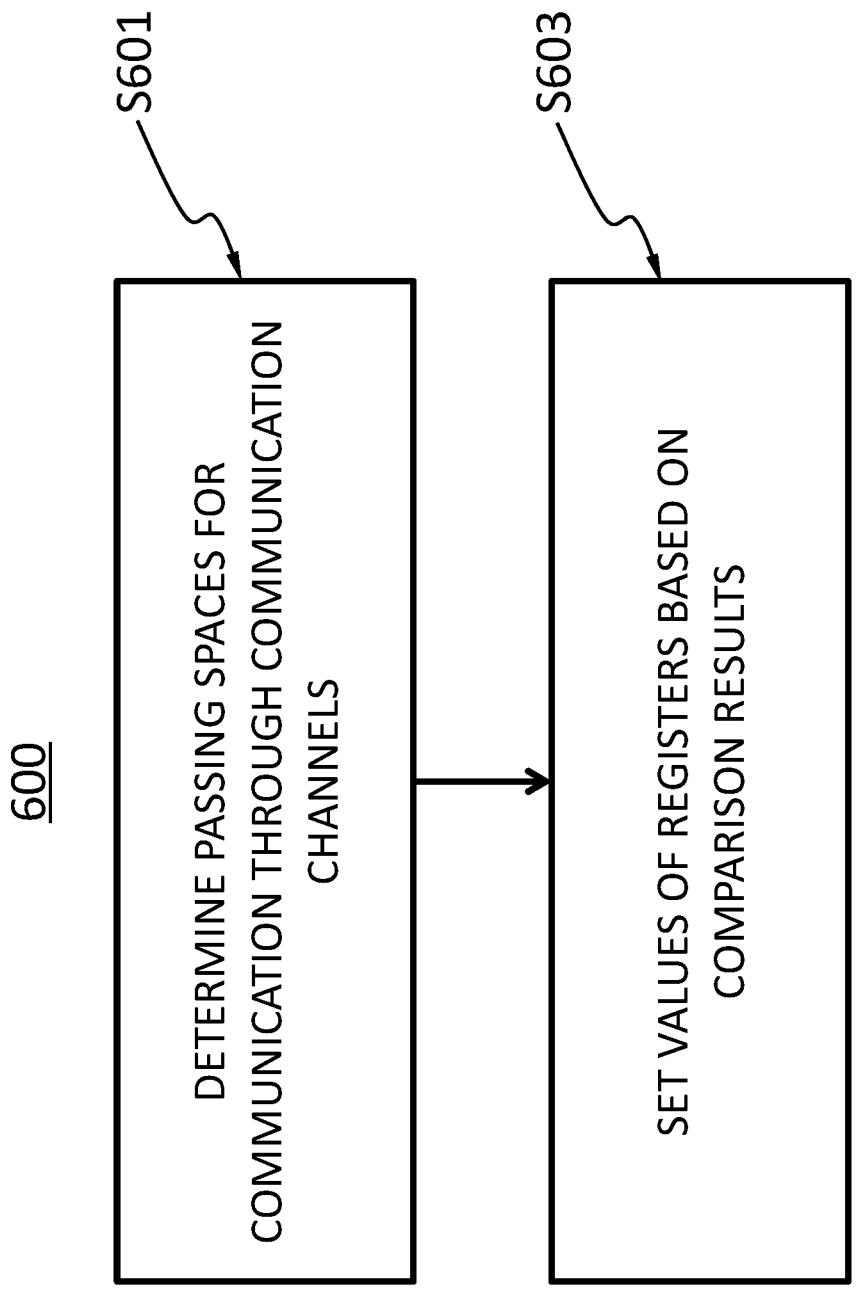
FIG. 6 schematically shows a flowchart of a process of determining values of registers in accordance with an embodiment.

In an example, a process 600 of determining the values of the registers in accordance with an embodiment is shown in FIG. 6. In step S601, passing spaces of one or more parameters for communication through the communication channels may be determined using the processor. The one or more parameters may include frequency, reference voltage, clock delay (also known as clock phase delay, strobe delay, or timing delay) and other suitable parameters. Depending on the number of parameters used in step S601, the passing spaces may be a 1D space, 2D space, 3D space or higher dimension space. For example, the passing spaces may be of the frequency alone, of the combination of the frequency and the reference voltage, or of the combination of the frequency, the reference voltage and the clock delay.

The term "passing space of frequency" used here refers to a range of frequency at which communication can be successfully performed over a communication channel. Specifically, the processor may conduct write training or read training over each communication channel at various frequencies to determine the passing space of frequency for each communication channel. For example, during write training, it may be initiated by a write training command from the processor, and in response to the write training command, a write training data may be written to a memory through a communication channel. For another example, during read training, it may be initiated by a read training command from the processor, and in response to the read training command, a read training data may be read from a memory through a communication channel. Furthermore, the write training or read training may be conducted during system initialization stages.

The term "passing space of reference voltage" used here refers to a range of reference voltage at which communication can be successfully performed over a communication channel. In a similar approach to that for determining the passing space of frequency described above, the processor may conduct write training or read training over each communication channel at various reference voltages to determine the passing space of reference voltage for each communication channel.

The term "passing space of clock delay" used here refers to a range of clock delays at which communication can be successfully performed over a communication channel. The passing space of clock delay may be similarly determined by the processor.

In a specific example, at each of several values of the frequency (e.g., 800 MHz, 1000 MHz and 1200 MHz), the clock delay and the reference voltage are varied to determine a 2D passing space of the clock delay and the reference voltage at that value of the frequency. Varying the clock delay and the reference voltage may be performed by varying the clock delay at each of several values of the reference voltage or by varying the reference voltage at each of several values of the clock delay. Varying the clock delay and the reference voltage may be performed by varying the clock delay and the reference voltage at the same time.

In step S603, values of the registers in the storage controller may be set based on the passing spaces. Specifically, respective register bits in the registers may be set based on the passing spaces. Setting the values of the registers may involve comparing the passing spaces to predetermined thresholds using the processor. The predetermined thresholds may be determined empirically. For example, a predetermined threshold of the passing space of clock delay may be one third of a unit interval. The unit interval refers to the minimum time interval between condition changes of a data transmission signal, also known as the pulse time or symbol duration time. In general, the unit interval coincides with a bit period in an eye diagram of the data transmission signal, i.e. with the time interval taken to transmit one bit.

After the values of the registers are set in step S501, in step S502, using the clock generator 112, clock signals for the multiple communication channels may be generated based on the values stored in the registers. The clock signals are then provided to control units for the multiple communication channels. Specifically, the clock signal for a communication channel may have a clock frequency determined based on the value of the register corresponding to the communication channel.

In step S503, the controller may communicate with the memories through the communication channels respectively using the clock signals. Specifically, the clock signals provided to control units for the multiple communication channels may serve as internal clock signals of the memories. Interface data, strobe signals, and read enable signals of the storage system may be generated according to the internal clock signals. The interface data, strobe signals and read enable signals determine the communication speed on each of the multiple communication channels. The memories may be non-volatile memories. Examples of the non-volatile memories include, but are not limited to, NAND flash memories, NOR flash memories, MRAM, RRAM, PCRAM and Nano-RAM memories.

In an embodiment, the processor may further select one of the communication channels for storing data according to the values stored in the registers and access frequentness of the data. Specifically, data in a storage system may be categorized as "hot" or "cold" based on the access frequentness of the data by a host, with "hot" representing frequently accessed data and "cold" representing infrequently accessed data.

Figure 7:
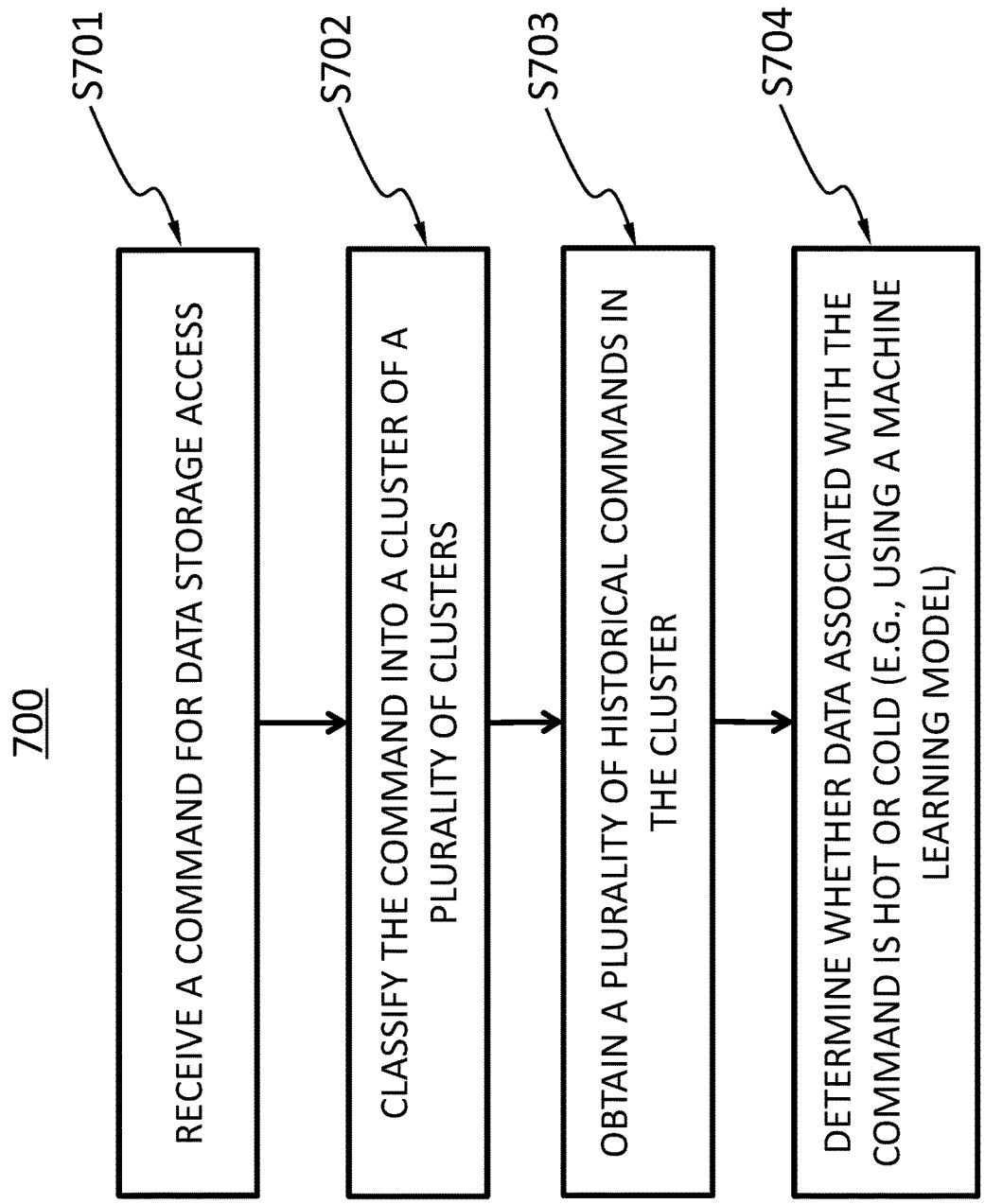
FIG. 7 schematically shows a flowchart of a process for determining hot/cold data in accordance with an embodiment.

FIG. 7 schematically shows a flowchart of a process 700 for determining hot/cold data in accordance with an embodiment. In step S701, a command may be received in a storage device. For example, a memory access command for reading or writing may be received by the controller of the storage device from the host. The command may be a write command to write the data associated with the command to the storage device or a read command to read the data associated with the command from the storage device. The command may contain an address for data storage in the storage device and a length for a size of data associated with the command. In step S702, the command may be classified into one of a plurality of clusters. For example, the host may have many applications running and each application may have different storage access patterns. The controller may generate a plurality of clusters using a clustering machine, for example, a machine learning clustering model such as a K-means clustering machine, and classify the command into one of the plurality of clusters using the clustering machine. In an embodiment, the classification may be based on the address, length and/or age of the command.

In step S703, a plurality of historical commands of the cluster may be obtained. For example, the controller may be configured to keep records of previous commands. Once the command is classified into a cluster, a plurality of previous commands classified into the same cluster may be obtained from a storage medium. As described herein, the plurality of historical commands may include a pre-determined number of most recent commands that had been classified into this cluster. In step S704, whether the data associated with the command is hot or cold may be determined, for example, using a machine learning model. The address and the length of the command and addresses and lengths of the plurality of historical commands may be used as input features to the machine learning model.

By storing the hot data into the memory over communication channels with higher communication speed, the storage device can achieve higher performance and lower latencies. It further enables placing and connecting memories of different types, latencies and speed grades to different channels. For example, the storage device can place and connect a fast memory with lower latency and higher speed to a faster communication channel, and may place and connect a slower memory with higher latency and lower speed to a slower communication channel. This approach may further improve performance with reduced cost.

In an embodiment, a system. The system may include the controller described above. For example, the system may be an SSD, a flash drive, a mother board, a processor, a computer, a server, a gaming device, or a mobile device.

In an embodiment, a non-transitory machine-readable medium may have instructions stored therein. The instructions, when executed by a hardware processor system, may cause the hardware processor system to perform any one of the methods described above.

The word "processor" used herein, despite in the singular form, is not limited to a single physical processor. The word "processor" used herein may encompass a plurality of physical processors and the language that a processor is configured to perform multiple functions encompasses the plurality of physical processors each configured to perform some but not necessarily all of the multiple functions.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A controller, comprising:
    a processor;
    registers; and
    a clock generator configured to generate clock signals respectively for multiple communication channels based on values stored in the registers,
    wherein the controller is configured to communicate with non-volatile memories through the communication channels respectively using the clock signals;
    wherein the processor is configured to determine and store the values into the registers;
    wherein the processor is further configured to determine passing spaces of one or more parameters for communication through the communication channels and configured to determine the values based on the passing spaces;
    wherein the clock generator comprises clock sources and multiplexers; and wherein each of the multiplexers is connected to at least one of the clock sources and is configured to generate a clock signal by selecting one of the clock sources based on the values stored in the registers.

2. The controller of claim 1, wherein at least two of the clock signals have different frequencies.

3. The controller of claim 1, wherein the one or more parameters are selected from a group consisting of frequencies, reference voltages, and clock delays.

4. The controller of claim 1, wherein the processor is further configured to set the values stored in the registers based on the passing spaces.

5. The controller of claim 4, wherein the processor is further configured to select one or more of the communication channels for storing data according to the values stored in the registers and access frequentness of the data.

6. The controller of claim 1, wherein the clock generator further comprises one or more clock dividers respectively connected to the multiplexers and configured to generate the clock signals based on the values stored in the registers.

7. A system, comprising the controller of claim 1, wherein the system is a solid-state drive (SSD), a flash drive, a mother board, a processor, a computer, a server, a gaming device, or a mobile device.

8. A method of using the controller of claim 1, comprising:
    generating the clock signals, by using the clock generator, respectively for the multiple communication channels based on the values stored in the registers; and
    communicating with the non-volatile memories through the communication channels respectively using the clock signals.

9. The method of claim 8, wherein at least two of the clock signals have different frequencies.

10. The method of claim 8, further comprising: determining and storing the values into the registers by using the processor.

11. The method of claim 10, wherein determining the values comprises: determining passing spaces of one or more parameters for communication through the communication channels and determining the values based on the passing spaces, by using the processor.

12. The method of claim 11, wherein the one or more parameters are selected from a group consisting of frequencies, reference voltages, and clock delays.

13. The method of claim 11, wherein determining the values based on the passing spaces further comprises: setting the values stored in the registers based on the passing spaces, by using the processor.

14. The method of claim 8, further comprising: selecting one or more of the communication channels for storing data according to the values stored in the registers and access frequentness of the data, by using the processor.

15. The method of claim 8, wherein generating the clock signals comprises: generating the clock signals by selecting one of clock sources based on the values stored in the register, by using multiplexers in the clock generator or using the multiplexers and clock dividers connected thereto.

16. The method of claim 8, wherein the non-volatile memories are NAND flash memories, NOR flash memories, magnetoresistive random access memories (MRAM), resistive random access memories (RRAM), phase change random access memories (PCRAM), or Nano-RAM memories.

* * * * *